M. RODERICK.
VEHICLE TIRE.
APPLICATION FILED MAY 15, 1922.
1,438,663. Patented Dec. 12, 1922.
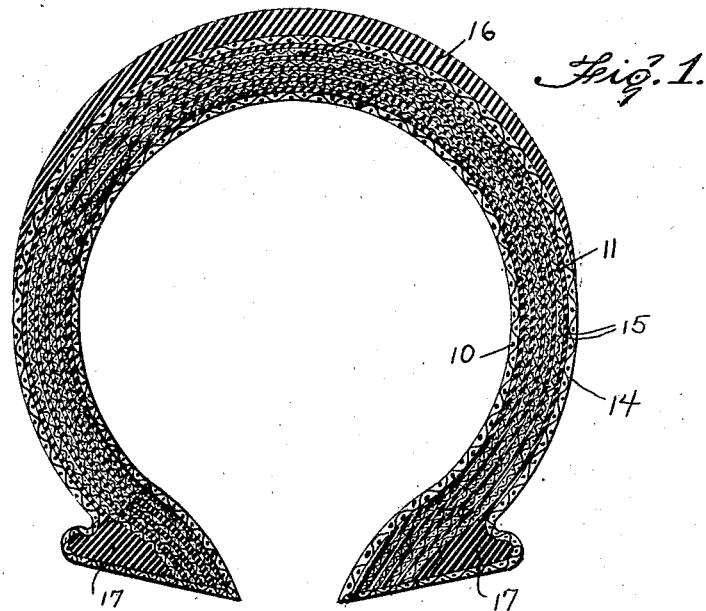
Fig. 1.
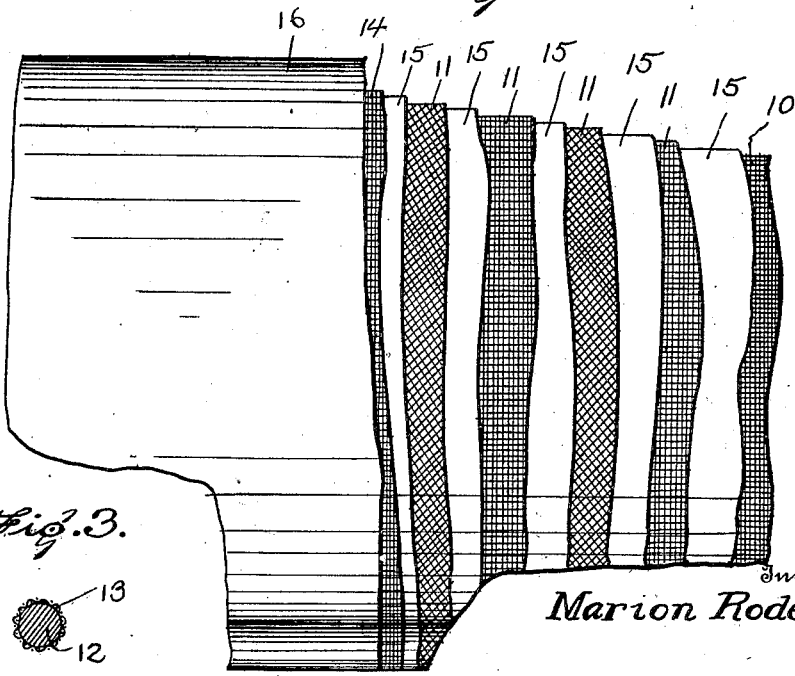
Fig. 2.
Fig. 3.
Inventor
Marion Roderick
By Watson E. Coleman, Attorney Patented Dec. 12, 1922.

1,438,663

UNITED STATES PATENT OFFICE.

MARION RODERICK, OF MISSOULA, MONTANA.

VEHICLE TIRE.

Application filed May 15, 1922. Serial No. 560,942.

*To all whom it may concern:*

Be it known that I, MARION RODERICK, a citizen of the United States, residing at Missoula, in the county of Missoula and State of Montana, have invented certain new and useful Improvements in Vehicle Tires, of which the following is a specification, reference being had to the accompanying drawings.

This invention relates to improvements in vehicle tires and has for an important object thereof the provision of a tire having great length of life.

A further object of the invention is to provide a tire of this character which, while ordinarily supported by an inflatable inner tube, has the side walls thereof of sufficient strength to prevent deformation of the tire when the inner tube is deflated, thereby permitting the use of the tire without an inner tube.

A still further object of the invention is to provide a tire of this character which is substantially puncture-proof and which is free from liability of blow-outs and ripping.

Other objects and advantages of the invention will become apparent throughout the course of the following description.

In the accompanying drawings, wherein for the purpose of illustration is shown a preferred embodiment of my invention and wherein like reference characters designate like parts throughout:

Figure 1 is a sectional transverse view taken through the tire constructed in accordance with my invention;

Figure 2 is a side elevation thereof, parts being broken away to illustrate the manner of building up the tire; and Figure 3 is an enlarged section taken through one of the wires employed in constructing certain of the layers employed in building up the tire.

Referring now more particularly to the drawings, the numeral 10 indicates an inner layer of fabric of a suitable character, such as canvas, and which may be of the same type of material as usually employed in the construction of tires. The numeral 11 indicates layers, in the present instance shown as four in number, of metallic fabric.

These layers 11 are formed by employing steel wire 11 which has been dipped in acid to render the surface thereof rough. This surface is then covered by fabric 13 and the wire woven to form the fabric layers 11. Alternate layers 11 have the direction of weave thereof disposed at an angle of 45 degrees, as more clearly seen in Figure 2. A further layer of canvas or similar fabric is superposed upon the outer surface of the outermost layer 11, a thin sheet of rubber 15 being interposed between each of the sheets 11 and between the innermost sheet 11 and the fabric layer 10, and the outermost sheet 11 and the fabric layer 14. The layers are then bent to proper shape and the entire mass vulcanized together so that the layers of rubber 15 are caused to combine with the various layers 10, 11 and 14 to form a homogeneous mass. Upon the outer surface of this mass is then vulcanized the usual tread 16 and the beads 17 may be secured by any of the common processes of manufacture.

It will be seen that the layers of fabric covered wire will prevent the entrance of foreign substance which might puncture an inner tube arranged within the tire. It will likewise be obvious that in this device the heat caused by friction due to rubbing of the strands of the wire fabric is eliminated through the roughening of the wires previously to their weaving and to the fact that they are covered by fabric. It will furthermore be obvious that when the tread 16 is worn away it will be possible to vulcanize upon the body of the tire a new tread, thus materially extending the life of the tire.

Many changes being possible in the shape and arrangement of the various parts hereinbefore set forth without materially departing from the spirit of my invention, I do not limit myself to the specific structure thereof except as hereinafter claimed.

What I claim is:

1. A tire comprising inner and outer layers of textile fabric, and a plurality of superposed layers of metallic fabric disposed intermediate the layers of textile fabric, each of said layers of metallic fabric comprising woven roughened steel wire covered with a textile material prior to weaving, alternate layers of metallic fabric having the direction of weave arranged at an angle of forty-five degrees, and layers of rubber material intermediate each of said layers of fabric and the next adjacent layers, the whole being vulcanized together to form a homogeneous mass.

2. A tire comprising inner and outer layers of textile fabric, and a plurality of superposed layers of metallic fabric disposed intermediate the layers of textile fabric, each of said layers of metallic fabric comprising woven roughened steel wire covered with a textile material prior to weaving, alternate layers of metallic fabric having the direction of weave arranged at an angle of forty-five degrees.

In testimony whereof I hereunto affix my signature.

MARION RODERICK.